United States Patent [19]
Jones et al.

[11] Patent Number: 5,823,494
[45] Date of Patent: *Oct. 20, 1998

[54] PEN HOLDER

[75] Inventors: Clifford Jones, South Woodham Ferrers Chelmsford; Peter P. Tsang, North Shoebury, both of Great Britain

[73] Assignee: Ford Global Technologies, Inc., Dearborn, Mich.

[*] Notice: This patent issued on a continued prosecution application filed under 37 CFR 1.53(d), and is subject to the twenty year patent term provisions of 35 U.S.C. 154(a)(2).

[21] Appl. No.: 572,822

[22] Filed: Dec. 14, 1995

[51] Int. Cl.⁶ ....................................................... A47F 5/00
[52] U.S. Cl. ...................... 248/309.1; 224/567; 224/571
[58] Field of Search ................ 248/309.1; 211/69.4, 211/70.6, 69.7, 69.1; 206/371; 15/435, 437; 227/277, 567, 571

[56] References Cited

U.S. PATENT DOCUMENTS

| | | | |
|---|---|---|---|
| 416,003 | 11/1889 | Logan | 15/437 |
| 723,729 | 3/1903 | Powles | 211/70.6 |
| 893,355 | 7/1908 | McIntyre | 206/317 |
| 2,006,843 | 7/1935 | Russell | 248/205.5 |
| 2,118,241 | 5/1938 | Sypher | 211/69.7 |
| 2,210,216 | 8/1940 | Putnok | 211/70.6 |
| 2,497,418 | 2/1950 | Schroeder | 15/437 |
| 2,829,852 | 4/1958 | Smith | 211/70.6 |
| 5,037,224 | 8/1991 | Wright | 15/437 |
| 5,413,223 | 5/1995 | Kang | 211/70.6 |

FOREIGN PATENT DOCUMENTS

| | | | |
|---|---|---|---|
| 12246 | of 1848 | Brazil | 206/371 |
| 2700142 | 11/1992 | France . | |
| A-87 421 | 4/1921 | Switzerland . | |
| 277608 | 2/1927 | United Kingdom . | |
| 2251582 | 7/1992 | United Kingdom . | |
| 94/10883 | 5/1994 | WIPO . | |

Primary Examiner—Leslie A. Braun
Assistant Examiner—Gwendolyn W. Baxter
Attorney, Agent, or Firm—Damian Porcari

[57] ABSTRACT

A pen holder holds a pen 16 by friction created between the surface of the pen and the surface of the holder. The holder has a bridge 12 which stands up above a base plate 10, and two opposed reaction surfaces 12, 14 so that the pen can be pushed into the holder to create friction between the holder and three longitudinally spaced points on the pen body.

2 Claims, 1 Drawing Sheet

PEN HOLDER

BACKGROUND OF THE INVENTION

This invention relates to a pen holder for holding a pen in a secure position.

It is often desirable to be able to provide a holder for a pen, into which the pen can be easily inserted and yet which holds the pen secure and ready for use. This requirement exists for example in motor vehicles, but also in other environments.

It is desirable that a pen holder should be easy to use, i.e., it should be easy to insert the pen into the holder and easy to remove the pen from the holder, and the holder should also be able to accommodate pens of varying sizes.

SUMMARY OF THE INVENTION

In this specification, the term "pen" is used to refer to writing implements generally, and includes in particular pencils and other elongate writing implements.

According to the invention, there is provided a pen holder comprising a base plate and a bridge member upstanding from the base plate. The bridge member includes an underside facing towards the base plate forming a first reaction surface. The base plate defines a second and third reaction surface. Each of said second and third reaction surfaces face in a direction towards the first reaction surface. The second reaction surface lies below the first and third reaction surfaces in a direction generally perpendicular to the base plate. The first reaction surface lies between the second and third reaction surfaces in a direction generally parallel to the base plate. The arrangement of the first, second and third reaction surfaces are such that a pen may be wedged in a position where it is in contact with the first, second and third reaction surfaces and is retained firmly within the holder.

References in this specification to spatial orientation, e.g., 'above' or 'height' refer to the situation where the interior surface is horizontal. The invention is not however limited to an arrangement where the interior surface is horizontal, and terms in the specification should be construed accordingly.

The first reaction surface is preferably formed by the underside of a bridge member upstanding from the base plate, and the second reaction surface is preferably formed by the top of a wall which lies above the interior surface.

When a pen is held in the holder, the pen body is stressed slightly in bending, and limbs of the bridge member which stand up from the interior surface are stressed in tension. Although neither of these stresses is sufficient to noticeably distort either the pen or the bridge member, the stresses are sufficient to ensure that friction produced between the pen and the various surfaces is sufficient to wedge the pen firmly in place.

The base plate may be flat or, as is preferred, may be dished to guide the tip of the pen into the bridge member. Where the interior surface is dished, the wall upper surface may be formed by an edge of the dished region.

The pen holder may be molded in one piece from plastics material.

The longitudinal distance between the bridge and the wall upper surface is preferably between 30 and 70 millimeters, most preferably between 35 and 55 millimeters.

The height of the underside bridge member that forms a first reaction surface facing and above the base plate is preferably 10 to 20 millimeters, most preferably 13 to 18 millimeters. The height of the wall upper surface that forms a third reaction surface is preferably 5 to 10 millimeters, most preferably 7 to 9 millimeters above the base plate.

The pen holder can be mounted in substantially any orientation. To insert the pen in the holder is a single operation requiring only that the pen be pushed in one direction.

BRIEF DESCRIPTION OF THE DRAWINGS

The invention will now be further described, by way of example, with reference to the accompanying drawings, in which.

DETAILED DESCRIPTION OF THE PREFERRED EMBODIMENTS

Figure 1:
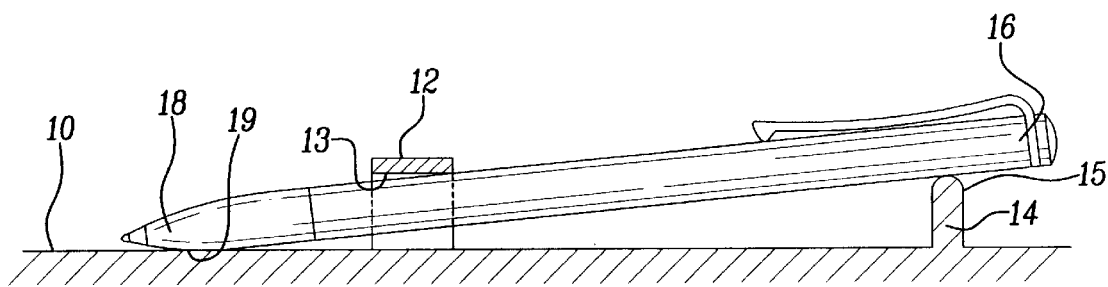
FIG. 1 is a cross-sectional view through a first embodiment of the invention.

FIG. 1 shows a pen holder on a flat interior surface 10 with a bridge 12 upstanding from the interior surface, and a raised wall 14. A pen 16 is held in this pen holder by inserting the tip 18 of the pen under the bridge 12 until the pen becomes wedged with a point near the tip 18 jammed against the interior surface, with an intermediate part jammed under the bridge 12 and with a part nearer the top end of the pen jammed against the upper surface of the wall 14.

It has been found that with a relatively low insertion force, an effective holding of the pen is achieved which keeps the pen secure, prevents it from rattling and yet allows easy withdrawal from the holder. In this respect it will be noted that the top end of the pen is held above the surface 12 where it is easy to grip it to withdraw the pen from the holder.

Figure 2:
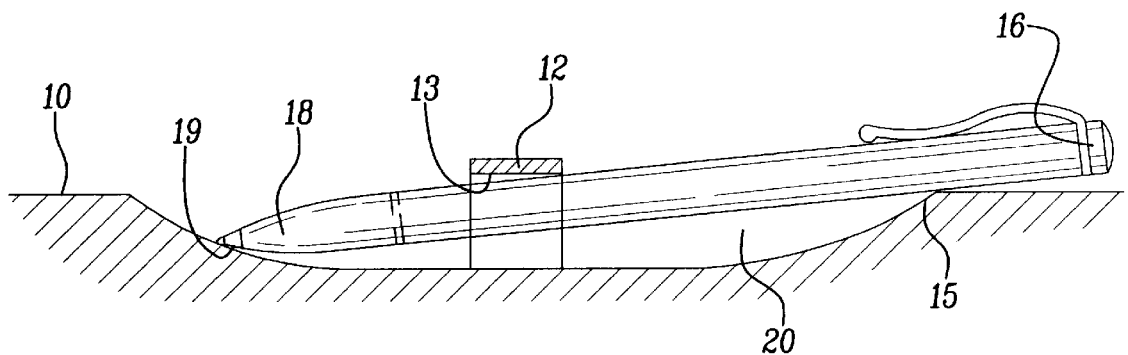
FIG. 2, is a cross-sectional view through a second embodiment of the invention.
Figure 3:
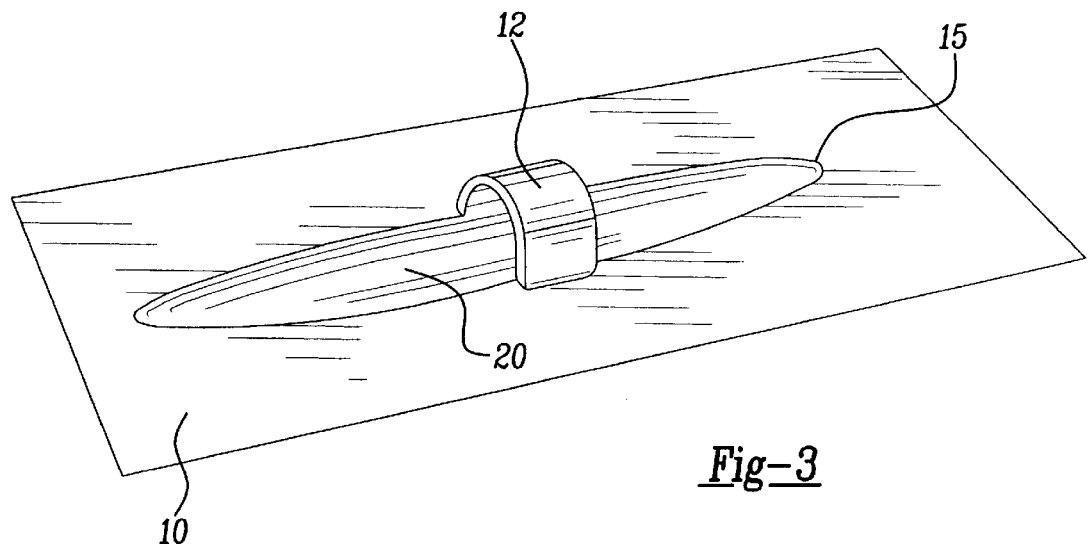
FIG. 3, is a perspective view of the second embodiment of the invention.

FIGS. 2 and 3 show an alternative embodiment where the tip 18 of the pen is located in a recess 20 of the baseplate. By recessing that part of the interior surface where the pen is to lie, the tip of the pen is protected, the height of the bridge 12 is reduced and the wall upper surface 14 can be formed by an edge of the recess.

FIG. 1 shows a pen holder on a flat base plate 10 with a bridge member 12 upstanding from the base plate 10, and a raised wall 14. The underside of bridge member 12 forms a first reaction surface 13. A pen 16 is held in this pen holder by inserting the tip 18 of the pen under the bridge member 12 until the tip 18 of pen 16 contacts a second reaction surface 19. The pen 16 becomes wedged with a point near the tip 18 jammed against the base plate 10, with an intermediate part of pen 16 jammed under the first reaction surface 13 and with a portion nearer the end of the pen 16 jammed against a third reaction surface 15 at wall 14.

It has been found that with a relatively low insertion force, an effective holding of the pen is achieved which keeps the pen secure, prevents it from rattling and yet allows easy withdrawal from the holder. In this respect it, will be noted that the top end of the pen is held above the base plate 10 where it is easy to grip it to withdraw the pen from the holder.

FIGS. 2 and 3 show an alternative embodiment where the tip 18 of the pen is located in a recess 20 of the base plate 10. By recessing that part of the base plate 10 where the pen 16 is to lie, the tip of the pen 18 is protected, the height of the bridge member 12 above the base plate 10 is reduced and the third reaction surface 15 can be formed by an edge of the recess 20.

The pen holder described above differs from many existing pen holders in that the pen body is stressed when held in the holder, and it is this stress which ensures that sufficient friction exists between the three points where the pen makes contact with the holder, to hold the pen in place.

What is claimed:

1. A pen holder for an interior automotive door comprising:

a rigid panel for attachment to said interior automotive door, said panel having an interior surface, said interior surface having a raised wall and a bridge member, said raised wall having an edge above said interior surface, and said bridge member having an under surface, said bridge member receiving an elongated article that is removably retained on said interior surface, said article being under stress by said interior surface, said undersurface, and said raised wall edge, when said article is inserted under said bridge and wedged on said raised wall and said interior surface.

2. A pen holder for an interior automotive door comprising:

a rigid panel for attachment to said interior automotive door, said panel having an interior surface, said interior surface having a recess, said recess having an edge, a bottom surface below said edge, and a bridge over said recess, said bridge having an undersurface, said recess receiving an elongated article that is removably retained on said interior surface, said article being under stress by said edge, said undersurface, and said bottom surface, when said article is inserted under said bridge and wedged in said recess.

* * * * *